United States Patent [19]
Risley et al.

[11] Patent Number: 5,378,106
[45] Date of Patent: Jan. 3, 1995

[54] COMPRESSED GAS CYLINDER SAFETY TRANSPORT DEVICE

[75] Inventors: Kevin S. Risley, Hixson; Jack H. Daniel, Chattanooga, both of Tenn.

[73] Assignee: Cannon Equipment Company, Cannon Falls, Minn.

[21] Appl. No.: 37,761

[22] Filed: Mar. 26, 1993

[51] Int. Cl.⁶ .............................................. B65G 1/10
[52] U.S. Cl. .................................. 414/608; 312/330.1; 220/1.5; 414/522; 414/607; 414/910; 410/36; 410/100
[58] Field of Search ............... 414/607, 608, 522, 910; 410/96, 97, 98, 100, 34–38; 108/44, 51.1, 52.1, 55.1, 143; 220/1.5, 400, 242, 287, 315, 375; 312/304, 330.1, 334.1, 334.7, 350, 351.1

[56] References Cited

U.S. PATENT DOCUMENTS

| | | | |
|---|---|---|---|
| 2,841,302 | 7/1958 | Reisman et al. | 414/608 |
| 3,294,034 | 12/1966 | Bodenheimer et al. | 220/1.5 X |
| 3,369,684 | 2/1968 | Ford | 414/522 X |
| 3,455,469 | 7/1969 | Evans | 414/607 X |
| 4,061,391 | 12/1977 | Violette | 410/36 X |
| 4,295,431 | 10/1981 | Stavlo | 220/1.5 X |
| 4,621,876 | 11/1986 | Reimer | 312/330.1 |

FOREIGN PATENT DOCUMENTS 1437268  11/1988  U.S.S.R. ............... 410/100

*Primary Examiner*—Frank E. Werner
*Attorney, Agent, or Firm*—Sten Erik Hakanson

[57] ABSTRACT

The present invention is a compressed gas cylinder carrier for retaining and transporting a plurality of such cylinders. The carrier includes a cage or framework having a base and top interconnected by a plurality of vertical bars. The base includes slide rails on which is slideably mounted a sled that can move between opposite ends of the carrier within the framework thereof. The sled has a base and a sidewall portion integral there with and extending upward there from. The sled base and sidewall form a cylinder retaining space. One carrier end has a hinged door for providing access to the interior of the carrier. A strap extends around the sled and is engaged through an adjustable buckle secured to the door. The top end of the carrier has a roof structure for forming a forklift receiving cavity. In operation, the present invention is sized to retain a plurality of compressed gas cylinders. The cylinders are placed and held within the interior of the framework wherein one cylinder rides on the sled being retained on the base thereof and the remaining cylinders rest on the slides of the framework base. Access to the frame interior is through the end door. When fully loaded, the sled is positioned at the end of the carrier opposite from the access door. The door can then be secured closed and the strap pulled through the buckle wherein the carrier is urged and held against the other cylinders, thereby pressing such cylinders against the secured access door. In this manner any space between the cylinders is taken up so that they are securely held together within the carrier framework.

16 Claims, 5 Drawing Sheets

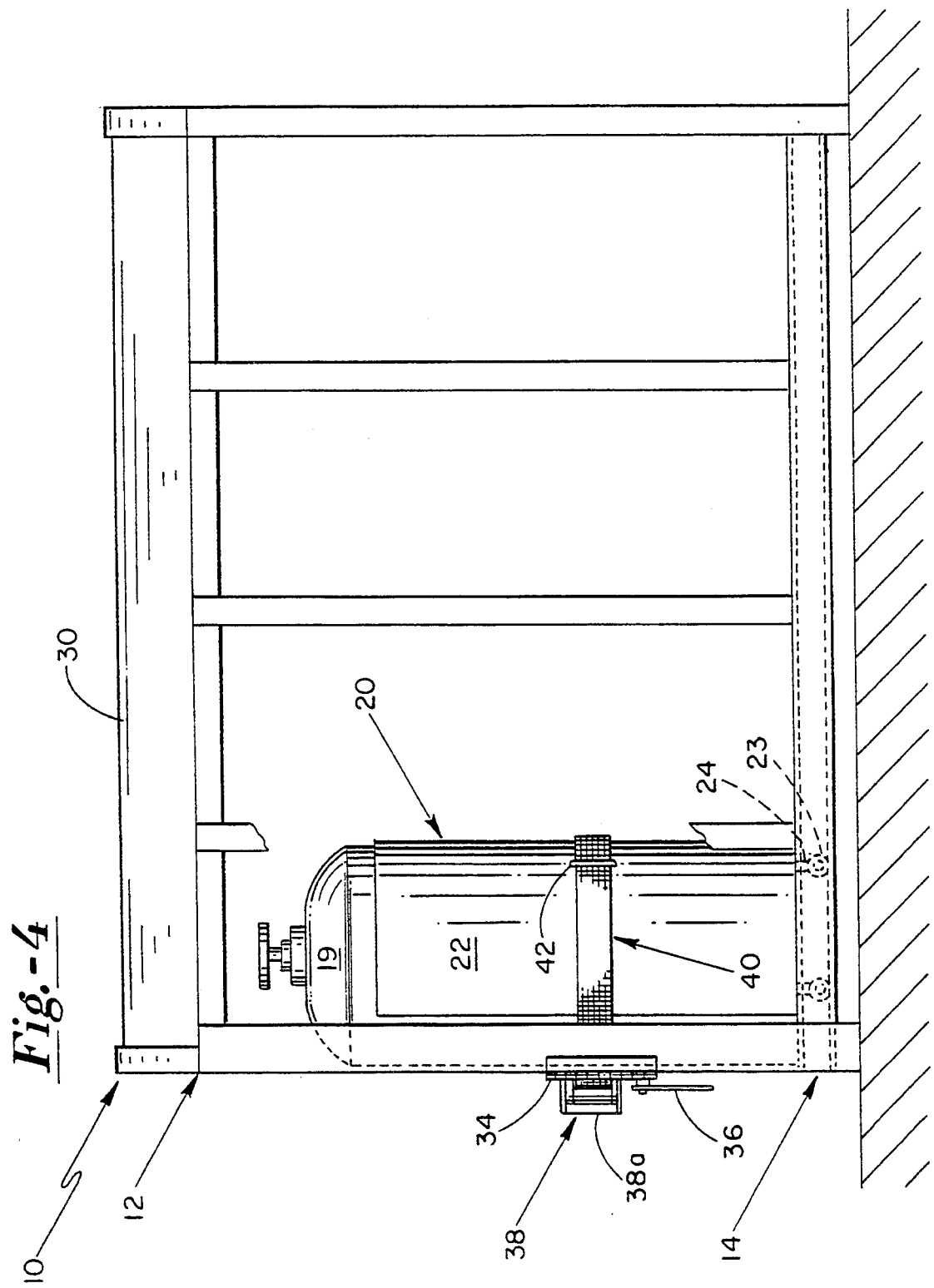

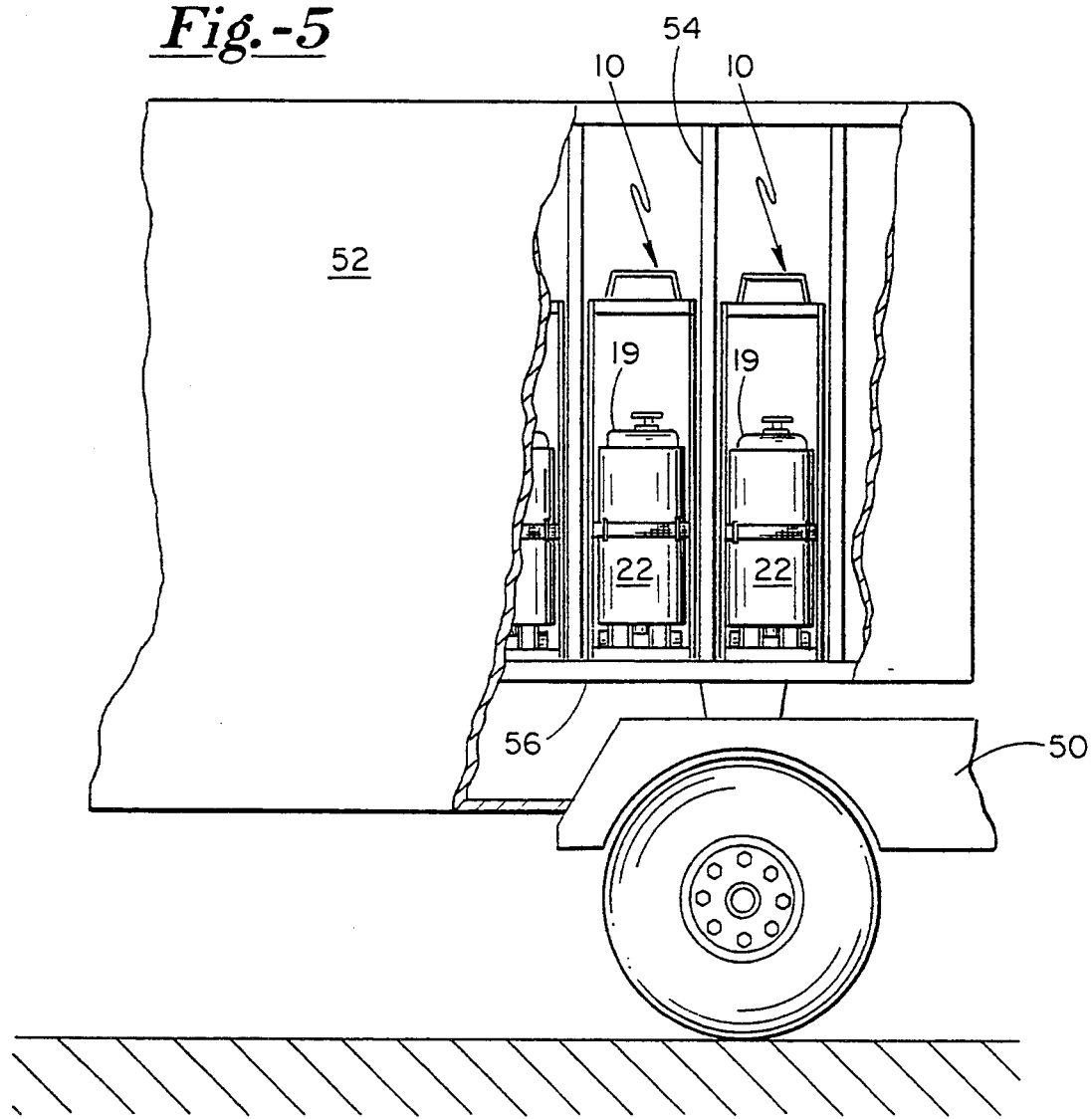

COMPRESSED GAS CYLINDER SAFETY TRANSPORT DEVICE

BACKGROUND

1. Field of the Invention

The present invention relates generally to devices for safely retaining compressed gas cylinders, and in particular to such devices as are also used for safely transporting such cylinders.

2. Background of the Invention

It is well known in the art that cylinders containing compressed gasses present a very considerable potential safety hazard, as rupturing of such a container can result in a very energetic explosion. This danger is compounded if the gas is flammable and/or toxic.

Typically such cylinders are transported in a truck in an upright position and secured by chains or the like to side walls of the truck bed. Various hand carts are also known for transporting the cylinder from the truck to the desired location, and include means for safely loading and securing the cylinder thereto.

A particular problem exists in the beverage industry where cylinders of compressed carbon dioxide gas must be transported to various retail locations for use in the production of fountain dispensed carbonated drinks. Although carbon dioxide gas is not flammable or toxic, it is compressed to relatively high pressures such that any rupture of a typically sized 43 pound cylinder can result in a very powerful explosion. Heretofore, such cylinders have been transported simply lying horizontally in a truck bed, and in many cases not tied down or otherwise restrained. This form of transport has been convenient for the route driver who has numerous stops on a daily basis. However, this approach is no longer viable under current transportation regulations which require such cylinders to be transported in a secured manner in an upright or vertical position on a relatively flat surface. A problem therefore arises if the same convenience is to be maintained in light of the new regulations. A further problem exists in that any solution to the problem must be space efficient as beverage delivery trucks do not, as a rule, have much excess in storage capacity.

Accordingly, it would be very desirable to have a device for holding and transporting compressed gas cylinders that provides for adherence to the relevant regulations, that is convenient and easy to use and that efficient in its use of space.

SUMMARY OF THE INVENTION

The present invention is a portable compressed gas cylinder carrier for retaining and transporting a plurality of such cylinders. The carrier includes a cage or framework having a base and top interconnected by a plurality of vertical bars. The base includes slide rails on which is slideably mounted cylinder sled that can move between opposite ends of the carrier within the framework thereof. The sled has a base and a sidewall portion integral there with and extending upward there from. The sled base and sidewall form a cylinder retaining space. One carrier end has a hinged door for providing access to the interior of the carrier. A strap extends around the sled and is engaged through an adjustable buckle secured to the door. The top end of the carrier has a roof structure for forming a forklift receiving cavity.

In operation, the present invention is sized to retain a plurality of compressed gas cylinders. The cylinders are placed and held within the interior of the framework wherein one cylinder rides on the sled being retained on the base thereof and the remaining cylinders rest on the slides of the framework base. Access to the frame interior is through the end door. When fully loaded, the sled is positioned at the end of the carrier opposite from the access door. The door can then be secured closed and the strap pulled through the buckle wherein the carrier is urged and held against the other cylinders thereby pressing such cylinders against the secured access door. In this manner any space between the cylinders is taken up so that they are securely held together within the carrier framework. The fork retaining cavity provides for receiving a fork from a forklift or the like, for lifting the carrier into a desired truck or other vehicle. The truck preferably has an enclosed trailer having a carrier receiving space therein and sized to firmly retain one or more of the carriers of the present invention.

DESCRIPTION OF THE DRAWINGS

A further understanding of the structure, operation, objects and advantages of the present invention can be had in view of the following detailed description which refers to the following figures, wherein:

FIG. 4 shows a side view of the present invention showing one cylinder retained therein.

FIG. 5 shows a partial cross-sectional side view of a truck trailer in which the present invention can be transported.

DETAILED DESCRIPTION OF THE PREFERRED EMBODIMENT

Figure 1:
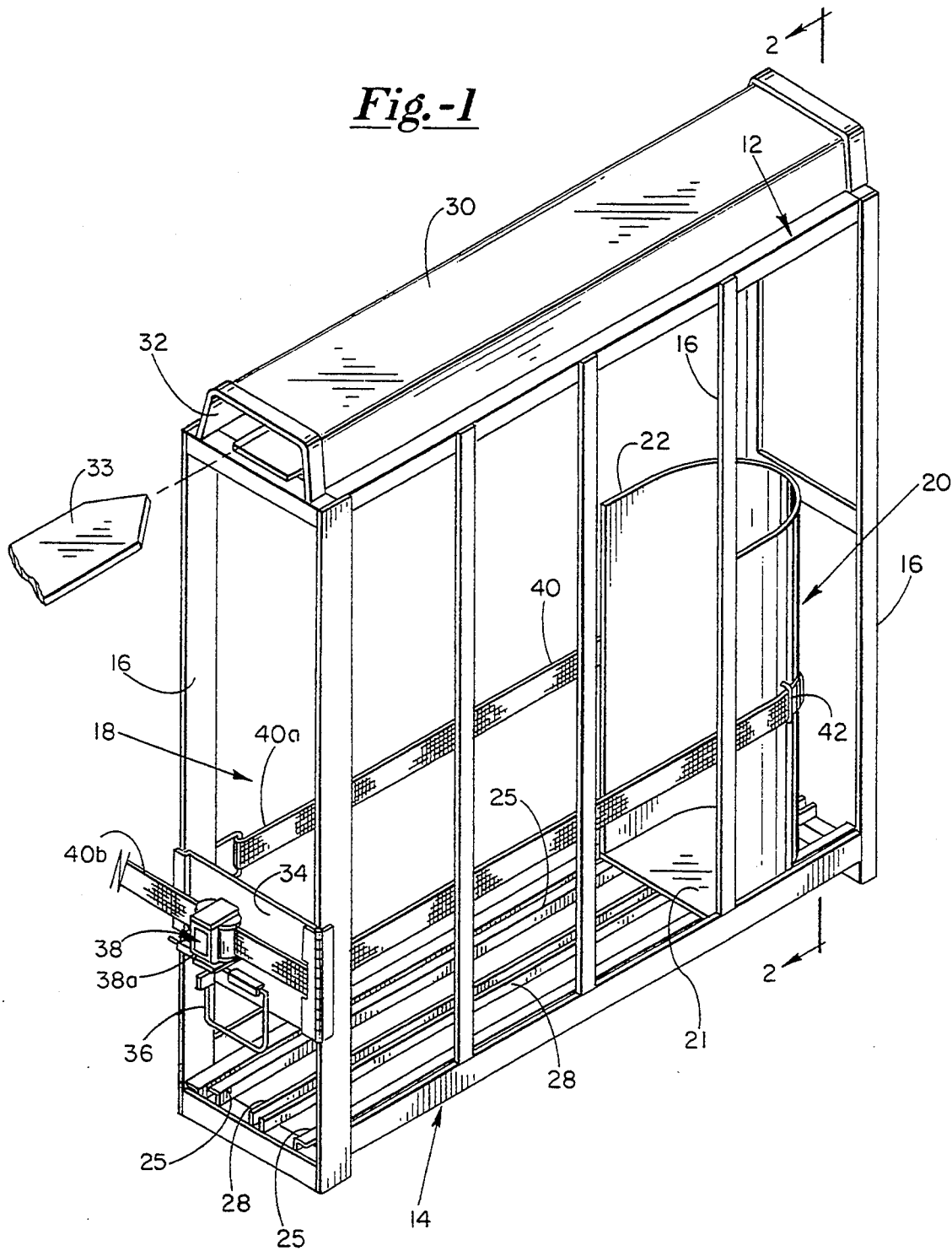
FIG. 1 shows a perspective view of the present invention.

The safety carrier of the present invention is seen in FIG. 1 and generally referred to by the numeral 10. Carrier 10 includes a frame having a top portion 12, a bottom portion 14 and plurality of rigid sidewall bars 16 secured thereto and extending there between. Top 12, bottom 14 and side bars 16 define an interior space 18 for retaining a plurality of compressed gas cylinders 19. A sled 20 has a floor 22 and a U-shaped sidewall secured thereto and extending upwardly therefrom.

Figure 2:
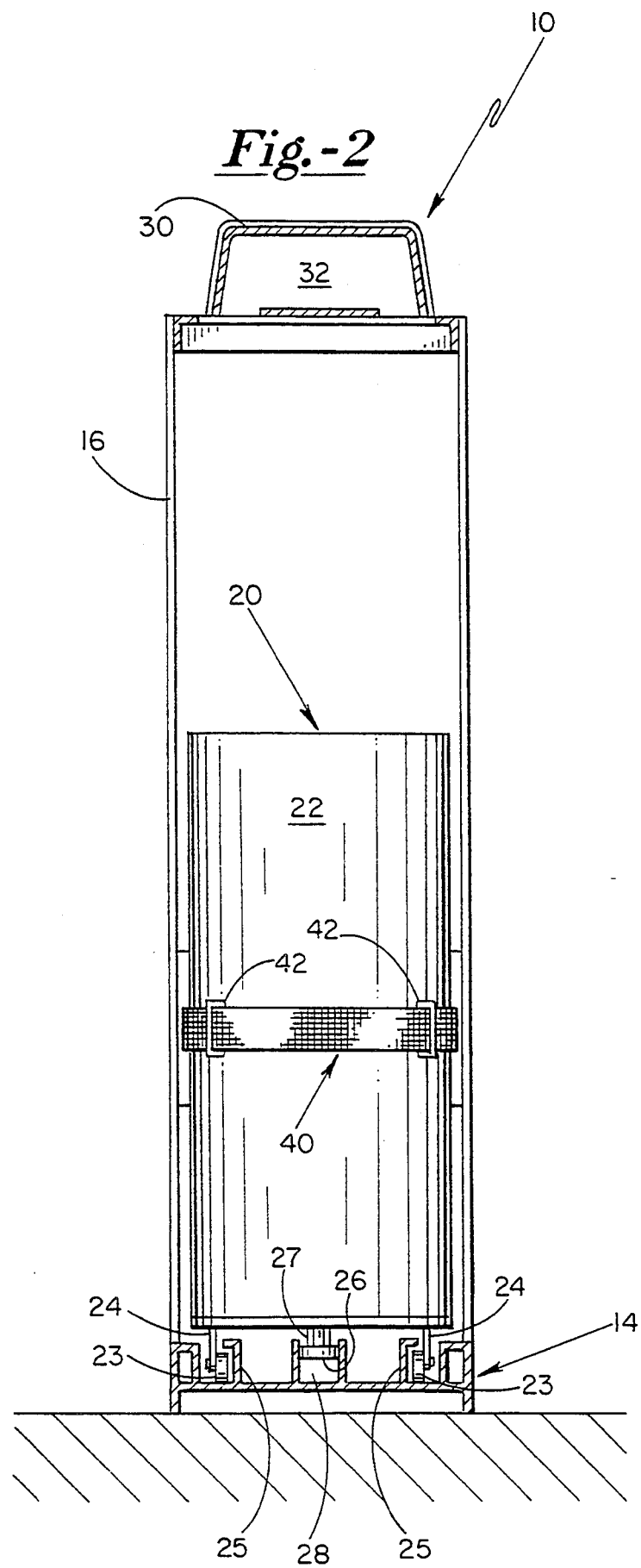
FIG. 2 shows an end view of the present invention along lines 2—2 of FIG. 1.

As seen in FIG. 2, sled 20 includes vertically oriented wheels 23 rotatively secured to supports 24. Wheels 23 are slideably retained in a pair of tracks 25, which tracks 25 are secured to and form a part of bottom portion 14. A pair of horizontally oriented wheels 26 are secured to supports 27 and are slideably engaged in a center track 28 secured to portion 14. Top portion 12 includes a roof structure 30 secured thereto which together form a cavity 32 for receiving a single fork 33 of a forklift, or the like.

Figure 3:
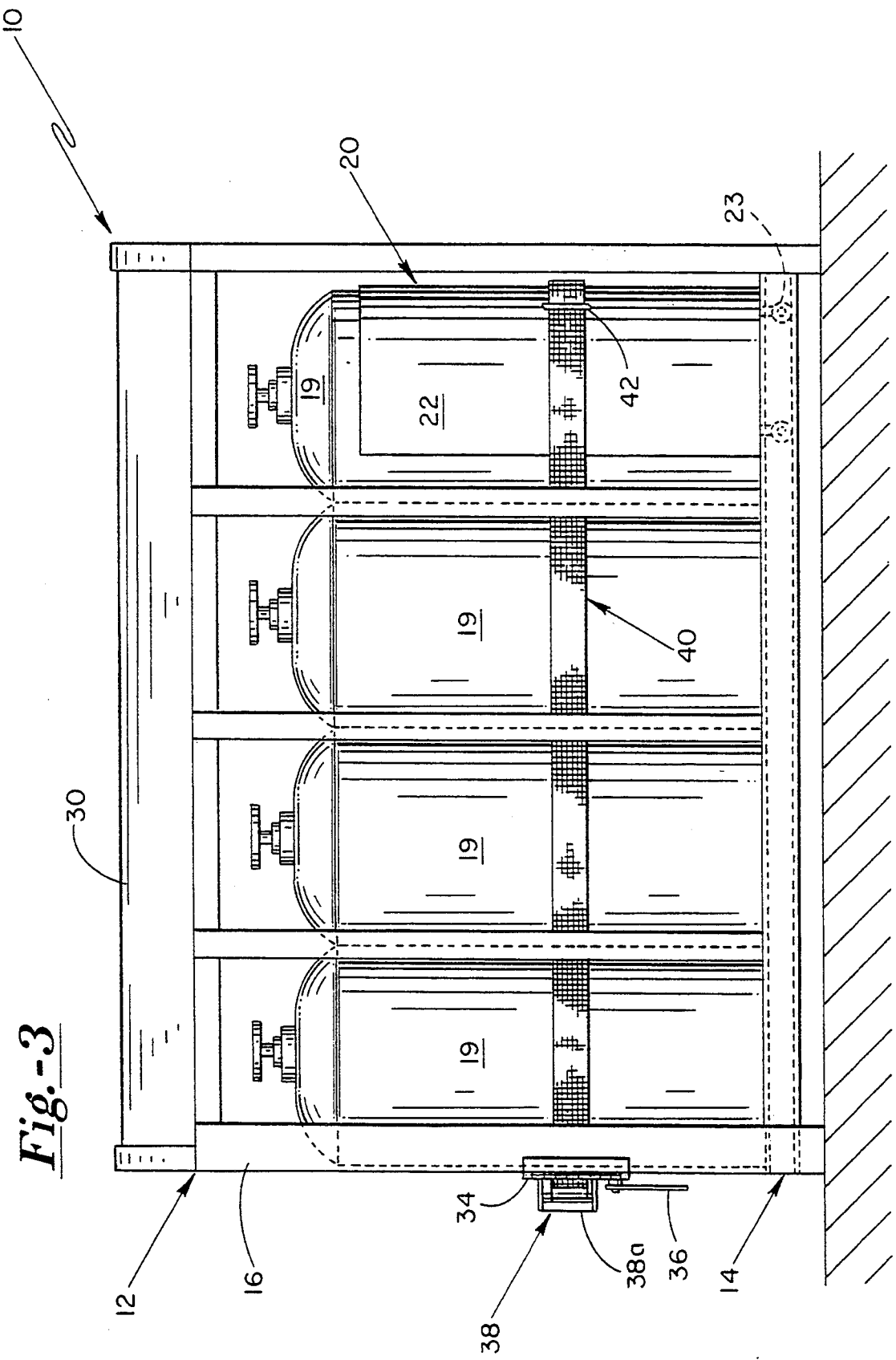
FIG. 3 shows a side view of the present invention with four cylinders retained therein.

One end of carrier 10 includes an access door 34 hingedly secured thereto. Door 34 includes a lock 36 for releasably securing door 34 in the closed position, seen in FIG. 2. Door 34 also includes a releasable tensioning means 38 attached thereto. A tightening strap 40 includes a first end 40a secured to a frame support bar 16 adjacent door 34. Strap 40 then extends around sled 20 and through two eyelets 42 thereof. The opposite end 40b of strap 40 extends through tensioning means 38. Tensioning means 38 includes a buckle mechanism 38a that provides for releasable grabbing or holding of strap 40. In operation it can be understood that sled 20 can ride on wheels 23 along tracks 25 from one end of carrier 10 to the other. Wheels 26 provide for resistance to torsional forces resulting in any twisting motion that could remove sled 20 from tracks 25. In particular, it can be understood that sled 20 can be moved towards door 34 by releasing buckle 38a and pulling on strap end 40b. Door 34 can then be opened and a cylinder 19 placed in sled 20 whereby the cylinder rest upon and floor 22. That cylinder can then be manually pushed away from door 34 to provide room for the addition of further cylinders 19 in space 18. It will be understood that these further cylinders will rest on tracks 28, whereas only the initial cylinder will be supported and carried by sled 20. As seen in FIG. 3, the present embodiment is designed for holding four 43 pound carbon dioxide cylinders typical for use in the beverage dispensing industry. Such cylinders are typically approximately 2.34 feet in height having diameter of approximately 0.67 feet. Carrier 10 is approximately 3 feet in overall height. However, it can be appreciated that the present invention could be sized to hold any variety of differently dimensioned cylinders or other objects requiring secure retaining. After carrier 10 is fully loaded strap end 40b can be pulled tight taking out any slack therein whereby sled 20 is urged in the direction of door 34. As buckle 38a provides for holding strap 40 in the position to which it is pulled, it can be seen that the cylinders 19 will then be held securely together. When a cylinder 19 is needed, buckle 38a is operated releasing its hold on strap 40, door 34 is opened and the cylinder first in line adjacent door 34 is easily removed. It can now be appreciated that door 34 can be closed and strap 40 again tightened pulling carrier 20, and the cylinders 19 thereon, towards door 34 taking up the space left by the removal of the one cylinder 19. The remaining cylinders 19 are again safe for transport.

As seen in FIG. 5, a truck 50 has a trailer 52 secured thereto. Trailer 52 includes a plurality of partition walls 54 spaced apart for receiving carriers 10 securely there between and on a flat floor surface 56 thereof. A forklift, not shown, can be used for inserting a fork 33 thereof into cavity 32. In this manner, carrier 10 can be easily and safely lifted into trailer 52 and loaded thereon, and subsequently removed therefrom.

The present invention has been described herein as including various specific structures. However, it will be apparent to those of skill that various modifications or rearrangements of the described structure can be made without departing from the spirit and scope of the underlying inventive concept thereof.

What is claimed is:

1. A carrier for securely and releasably holding a plurality of objects, comprising:
a rigid frame, the frame having a top end and a bottom end and sidewalls secured thereto and extending there between, and the frame having an access end for receiving the objects and a second end opposite therefrom, and the frame sidewalls and top, bottom, access and second ends defining a carrier interior space for retaining a plurality of the objects therein,
sled means slideably secured to the bottom end for moving between the access and second ends within the interior space and for retaining and carrying one of the objects thereon, and the carrier access and second ends having a width slightly greater than a width of each object and the carrier sidewalls having a height slightly greater than a height of each object so that the objects are positioned in a single file arrangement within the carrier interior space, and the sidewalls and the bottom, top, access and second ends being structured to protectively retain within and prevent the objects from falling out of the carrier, and the access end having means for providing releasable opening and closing thereof so that when in an open position the second end permits placing into or removal there through of the objects into the carrier interior space and when in a closed position the access end not permitting such movement of the objects there through sled moving and retaining means for moving the sled means in a direction from the second end towards the access end and for retaining the sled in a plurality of positions there between so that when an object is carried on the sled the sled can be moved and retained against the access end or moved and retained against one or more further objects positioned between the access end and the sled when the means for providing releasable opening and closing of the access end is in the closed position, and
the frame having means for facilitating the lifting and carrying of the career.

2. The carrier as defined in claim 1, and the means for providing releasable opening and closing of the access end comprising a door hingedly secured to the frame, and the door having latch means for securing the door in a closed position.

3. The carrier as defined in claim 2, and the sled moving and retaining means including a strap secured on a first end thereof to the frame adjacent the frame access end and extending therefrom in slideable engagement with the sled means to a strap second end, and the strap second end releaseably secureable to a tensioning buckle for releasably holding the strap in a plurality of positions so that the sled means can be urged towards the frame access end by pulling on the strap and held in any of a plurality of positions by operation of the tensioning buckle.

4. The carrier as defined in claim 3, and the tensioning buckle secured to the door.

5. The carrier as defined in claim 4, and the means for facilitating the lifting and carrying of the carrier comprising a housing on an exterior of the frame top end the housing defining a cavity for receiving lifting means for facilitating handling and loading of the carrier.

6. The carrier as defined in claim 1, and the sled moving and retaining means including a strap secured on a first end thereof to the frame adjacent the frame access end and extending therefrom in slideable engagement with the sled means to a strap second end, and the strap second end releaseably secureable to a tensioning buckle for releasably holding the strap in a plurality of positions so that the sled means can be urged towards the frame access end by pulling on the strap and held in any of a plurality of positions by operation of the tensioning buckle.

7. The carrier as defined in claim 1, and the means for facilitating the lifting and carrying of the carrier comprising a housing on the exterior of the frame top end the housing defining a cavity for receiving lifting means for facilitating handling and loading of the carrier.

8. A carrier for securely and releasably holding a plurality of objects wherein the objects have a width dimension smaller than a length dimension thereof, and the length dimension extending transverse to the width dimension, the carrier comprising:

a rigid frame, the frame having a top end and a bottom end and sidewalls secured thereto and extending there between, and the frame having an access end for receiving the objects and a second end opposite therefrom, and the frame sidewalls and top, bottom, access and second ends defining a carrier interior space for retaining a plurality of the objects therein, sled means slideably secured to the bottom end for moving between the access and second ends within the interior space and for retaining and carrying one of the objects thereon, and the carrier access and second ends having a width slightly greater than the width of each object and the carrier sidewalls having a height slightly greater than the height of each object so that the objects are positioned in a single file arrangement within the carrier interior spate, and the sidewalls and the bottom, top, access and second ends being structured to protectively retain within and prevent the objects from falling out of the carrier, and the access end having means for providing releasable opening and closing thereof so that when in an open position the second end permits placing into or removal there through of the objects to the carrier interior space and when in a closed position the access end does not permit such movement of the objects there through, sled moving and retaining means for moving the sled means in a direction from the second end towards the access end and for retaining the sled in a plurality of positions there between so that when an object is carried on the sled the sled can be moved and retained against the access end or moved and retained against one or more further objects positioned between the access end and the sled, and the top end defining a cavity for receiving lifting means for facilitating handling and loading of the carrier.

9. The carrier as defined in claim 8, and the means for providing releasable opening and closing of the access end comprising a door hingedly secured to the frame, and the door having latch means for securing the door in a closed position.

10. The carrier as defined in claim 9, and the sled moving and retaining means including a strap secured on a first end thereof to the frame second end and extending therefrom in slideable engagement with the sled means to a strap second end, and the strap second end releaseably secureable to a tensioning buckle for releasably holding the strap in a plurality of positions so that the sled means can be urged towards the frame second end by pulling on the strap and held in any of a plurality of positions by operation of the tensioning buckle.

11. The carrier as defined in claim 10, and the tensioning buckle secured to the door.

12. The carrier as defined in claim 8, and the sled moving and retaining means including a strap secured on a first end thereof to the frame second end and extending therefrom in slideable engagement with the sled means to a strap second end, and the strap second end releaseably secureable to a tensioning buckle for releasably holding the strap in a plurality of positions so that the sled means can be urged towards the frame second end by pulling on the strap and held in any of a plurality of positions by operation of the tensioning buckle.

13. A carrier for retaining therein and permiting the safe transport of compressed gas cylinders, the carrier comprising:

a rigid frame, the frame having a top end and a bottom end and sidewalls secured thereto and extending there between, and the frame having an access end second end opposite therefrom, and the frame sidewalls and top, bottom, access and second ends defining a carrier interior space for retaining a plurality of the cylinders therein, sled means slideably secured to the bottom end for moving between the access and second ends within the interior space and for retaining and carrying one of the cylinders thereon wherein the sled has a support plate on which a bottom end of a cylinder can rest, and the carrier access and second ends having a width slightly greater than a width of each cylinder and the carrier sidewalls having a height slightly greater than a height of each cylinder so that the cylinders are positioned in a single file arrangement within the carrier interior space, and the sidewalls and the bottom, top, access and second ends being structured to protectively retain within and prevent the cylinders from falling out of the carrier, and the access end having a door hingedly secured to the frame so that when in an open position the second end door permits placing into or removal of the cylinders from the carrier interior space, and when in a closed position the access end door does not permit such placement or removal of the cylinders, sled moving and retaining means for moving the sled means in a direction from the second end towards the access end and for retaining the sled in a plurality of positions there between so that when a cylinder is carried on the sled the sled can be moved and retained against the access end door or moved and retained against one or more further cylinders positioned between the access end and the sled so that one or more cylinders can be securely held within the carrier, and frame having means for facilitating the lifting and carrying of the carrier.

14. The carrier as defined in claim 13, and the sled moving and retaining means including a strap secured on first end thereof to the frame second end and extending therefrom in slideable engagement with the sled means to a strap second end, and the strap second end releaseably secureable to a tensioning buckle for releasably holding the strap in a plurality of positions so that the sled means can be urged towards the frame second end by pulling on the strap and held in any of a plurality of positions by operation of the tensioning buckle.

15. The carrier as defined in claim 14, and the tensioning buckle secured to the door.

16. The carrier as defined in claim 13, and the means for facilitating the lifting and carrying of the carrier comprising a housing on the exterior of the frame top end, the housing defining a cavity for receiving lifting means for facilitating handling and loading of the carrier.

* * * * *